United States Patent
Lee et al.

(10) Patent No.: US 9,454,131 B2
(45) Date of Patent: Sep. 27, 2016

(54) METHOD AND APPARATUS FOR FAST GENERATION OF HOLOGRAM

(75) Inventors: Seok Lee, Hwaseong-si (KR); Ho Cheon Wey, Seongnam-si (KR); Dong Kyung Nam, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 667 days.

(21) Appl. No.: 13/588,364

(22) Filed: Aug. 17, 2012

(65) Prior Publication Data

US 2013/0100510 A1    Apr. 25, 2013

(30) Foreign Application Priority Data

Oct. 19, 2011    (KR) .................. 10-2011-0106979

(51) Int. Cl.
*G03H 1/08*    (2006.01)

(52) U.S. Cl.
CPC ........ *G03H 1/0808* (2013.01); *G03H 2240/62* (2013.01)

(58) Field of Classification Search
CPC ................. G03H 1/0808; G03H 2001/303; G03H 2001/0858; G03H 1/0841; G03H 2001/0816; G03H 2001/0825; G03H 2001/0833; G03H 2210/44; G02F 2001/1635
See application file for complete search history.

(56) References Cited

U.S. PATENT DOCUMENTS

2010/0142016 A1*  6/2010  Cable et al. ...................... 359/9
2010/0149139 A1*  6/2010  Kroll et al. .................... 345/204

FOREIGN PATENT DOCUMENTS

| JP | 2000-259068 | 9/2000 |
|----|-------------|--------|
| JP | 2008-152081 | 7/2008 |
| JP | 2008-159200 | 7/2008 |
| KR | 10-0578182  | 10/2005 |

* cited by examiner

*Primary Examiner* — Jennifer L. Doak
(74) *Attorney, Agent, or Firm* — NSIP Law

(57) ABSTRACT

A method and apparatus for fast generation of a hologram image. The method may include generating a point hologram corresponding to each three-dimensional (3D) point using sub-sampling, generating a hologram pattern using the generated point hologram, and generating a 3D hologram by interpolating the generated hologram pattern.

25 Claims, 9 Drawing Sheets

POINT HOLOGRAMS
801

HOLOGRAM PATTERN
802

3D HOLOGRAM
803

| $P_{11}$ | $P_{12}$ | $P_{13}$ | $P_{14}$ | $P_{15}$ | $P_{16}$ | $P_{17}$ | $P_{18}$ |
|---|---|---|---|---|---|---|---|
| $P_{21}$ | $P_{22}$ | $P_{23}$ | $P_{24}$ | $P_{25}$ | $P_{26}$ | $P_{27}$ | $P_{28}$ |
| $P_{31}$ | $P_{32}$ | $P_{33}$ | $P_{34}$ | $P_{35}$ | $P_{36}$ | $P_{37}$ | $P_{38}$ |
| $P_{41}$ | $P_{42}$ | $P_{43}$ | $P_{44}$ | $P_{45}$ | $P_{46}$ | $P_{47}$ | $P_{48}$ |

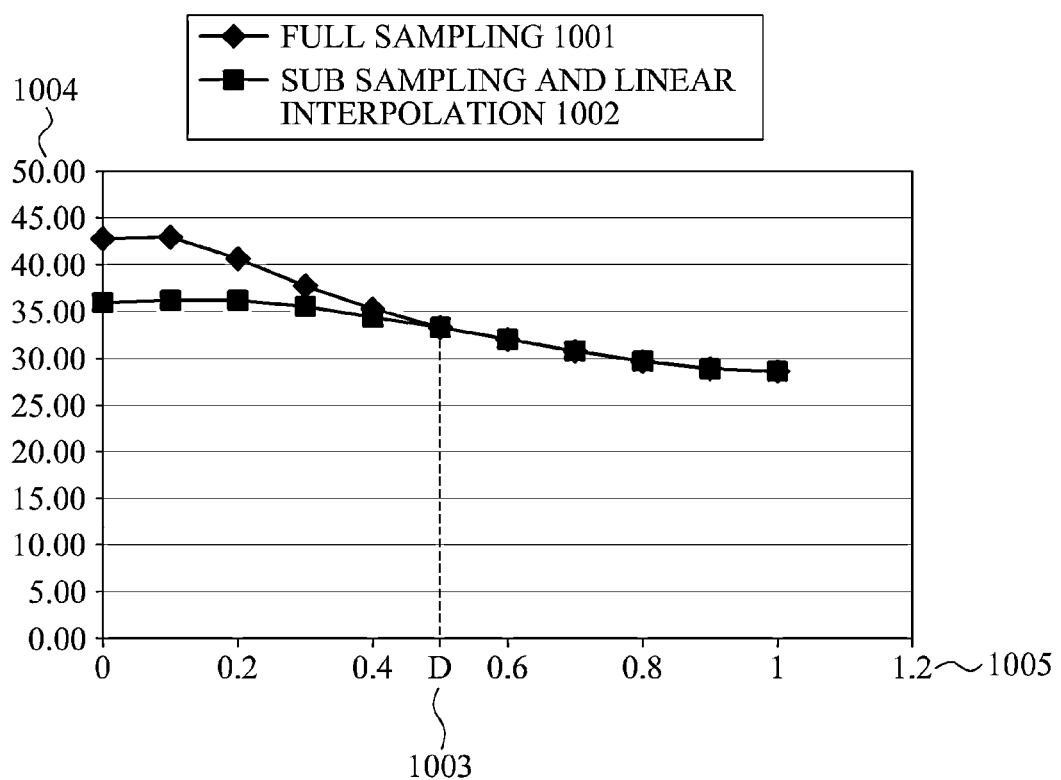

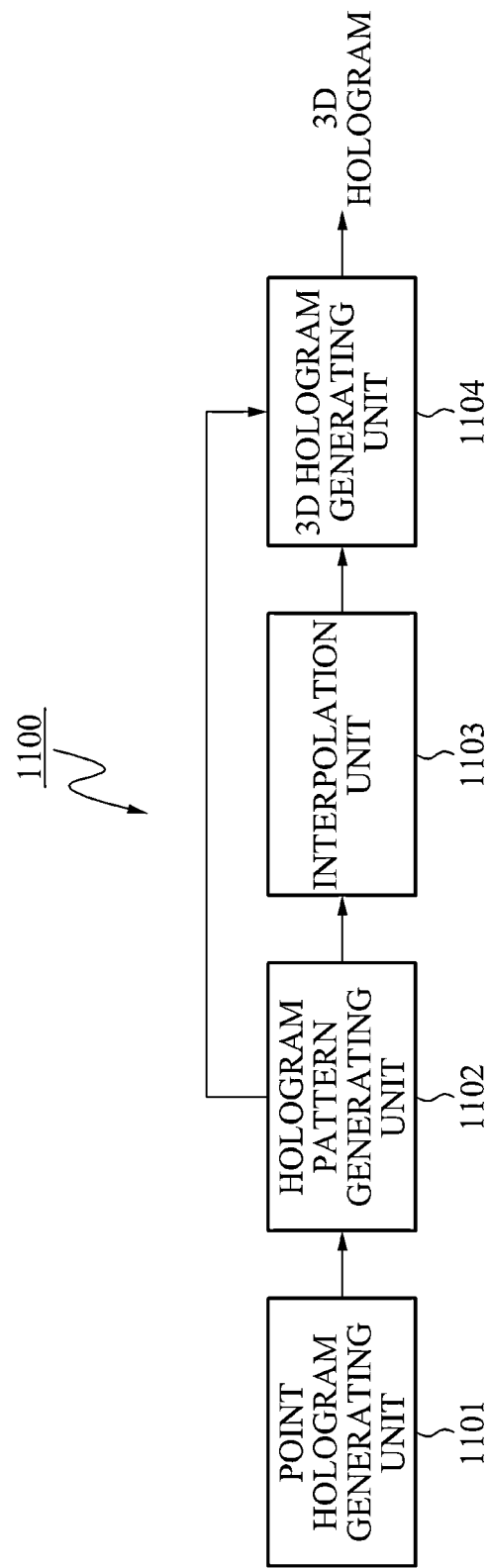

METHOD AND APPARATUS FOR FAST GENERATION OF HOLOGRAM

CROSS-REFERENCE TO RELATED APPLICATIONS

This application claims the priority benefit of Korean Patent Application No. 10-2011-0106979, filed on Oct. 19, 2011, in the Korean Intellectual Property Office, the disclosure of which is incorporated herein by reference.

BACKGROUND

1. Field

Example embodiments of the following description relate to a method and apparatus for fast generation of a hologram to express a real-time motion, by generating a hologram pattern using an operation device, such as, a computer.

2. Description of the Related Art

A three-dimensional (3D) display, for example, a stereo 3D display and a multiview 3D display, enables a viewer to recognize a depth of a 3D object by providing information about different viewpoints to both eyes of the viewer. In this instance, since a number of viewpoints used to display the 3D object is limited, and when a depth of the 3D object perceived by a human is different from a position at which light is actually generated, visual fatigue occurs.

A hologram has characteristics of having a limitless number of viewpoints and causes little visual fatigue since light is generated in all directions, at an actual position at which an object is perceived by a human.

However, an apparatus for generating a hologram requires a considerable amount of calculation during generation of a hologram pattern. In this instance, the amount of calculation increases in proportion to a number of a plurality of 3D points included in a 3D object, a number of pixels included in a spatial light modulator (SLM), and a number of frames per hour. An increase in the amount of calculation leads to an increase in an amount of time expended for generation of a 3D hologram. That is, since an amount of time expended in processing a real-time motion of the 3D object increases, difficulties lie in displaying the real-time motion naturally.

Accordingly, there is a need for a technology for fast generation of a 3D hologram by reducing an amount of calculation performed for generating a hologram pattern, and reproducing the generated 3D hologram using a 3D image reproducing device, for example, a 3D display or a projector.

SUMMARY

The foregoing and/or other aspects are achieved by providing a method of generating a hologram, the method including generating a point hologram by performing sub-sampling on a plurality of pixels included in a spatial light modulator (SLM), generating a hologram pattern using the generated point hologram, generating an interpolated hologram by performing an interpolation on the generated hologram pattern, and generating a three-dimensional (3D) hologram using the interpolated hologram.

The generating of the point hologram may include performing the sub-sampling by calculating a light distribution for each reference pixel, among the plurality of pixels included in the SLM.

The generating of the point hologram may include performing the sub-sampling on the plurality of pixels included in the SLM in a direction of an x-axis and in a direction of a y-axis, uniformly.

The generating of the interpolated hologram may include performing a linear interpolation on remaining pixels, excluding reference pixels from a plurality of pixels included in the hologram pattern.

The generating of the point hologram may include generating point holograms corresponding to a plurality of 3D points included in a 3D object. The generating of the hologram pattern may include generating the hologram pattern by accumulating the generated point holograms at the plurality of 3D points.

The foregoing and/or other aspects are achieved by providing a method of generating a hologram, the method including generating a point hologram by selectively performing sub-sampling on a plurality of pixels included in an SLM based on depth information of a 3D object and a reference value, generating a hologram pattern by accumulating point holograms corresponding to a plurality of 3D points included in the 3D object, and generating a 3D hologram using the generated hologram pattern.

The generating of the point hologram may include performing the sub-sampling by calculating a light distribution for each reference pixel, among the plurality of pixels included in the SLM.

The generating of the point hologram may include performing the sub-sampling on the plurality of pixels included in the SLM in a direction of an x-axis and in a direction of a y-axis, uniformly.

The method may further include generating an interpolated hologram by performing an interpolation on the hologram pattern when a point hologram is generated using the sub-sampling.

The generating of the interpolated hologram may include performing a linear interpolation on remaining pixels, excluding reference pixels from a plurality of pixels included in the hologram pattern.

The generating of the point hologram may include segmenting the 3D object into a plurality of regions, and performing the sub-sampling for each of the plurality of regions segmented, based on depth information of each of the plurality of regions segmented and the reference value.

The foregoing and/or other aspects are achieved by providing an apparatus for generating a hologram, the apparatus including a point hologram generating unit to generate a point hologram by performing sub-sampling on a plurality of pixels included in an SLM, a hologram pattern generating unit to generate a hologram pattern using the generated point hologram, an interpolation unit to generate an interpolated hologram by performing an interpolation on the generated hologram pattern, and a 3D hologram generating unit to generate a 3D hologram using the interpolated hologram.

The point hologram generating unit may perform the sub-sampling by calculating a light distribution for each reference pixel, among the plurality of pixels included in the SLM.

The point hologram generating unit may perform the sub-sampling on the plurality of pixels included in the SLM in a direction of an x-axis and in a direction of a y-axis, uniformly.

The interpolation unit may perform an interpolation on remaining pixels, excluding reference pixels from a plurality of pixels included in the hologram pattern.

The point hologram generating unit may generate point holograms at a plurality of 3D points included in a 3D object. The hologram pattern generating unit may generate the hologram pattern by accumulating the generated point holograms at the plurality of 3D points.

The foregoing and/or other aspects are achieved by providing an apparatus for generating a hologram, the apparatus including a point hologram generating unit to generate a point hologram by selectively performing sub-sampling on a plurality of pixels included in an SLM based on a reference value and depth information of a 3D object, a hologram pattern generating unit to generate a hologram pattern by accumulating a point hologram corresponding to each of a plurality of 3D points included in the 3D object, and a 3D hologram generating unit to generate a 3D hologram using the generated hologram pattern.

The apparatus may further include an interpolation unit to generate an interpolated hologram by performing an interpolation on the hologram pattern when a point hologram is generated using the sub-sampling.

The point hologram generating unit may segment the 3D object into a plurality of regions, and may perform the sub-sampling for each of the plurality of regions segmented, based on depth information of each of the plurality of regions segmented and the reference value.

A non-transitory computer-readable medium including a program for instructing a computer to perform the method of generating the hologram may be provided.

The example embodiments may include a method and apparatus that may generate a 3D hologram fast, by performing sub-sampling to reduce an amount of calculation performed for generating a hologram pattern.

The example embodiments may also include a method and apparatus that may generate a 3D hologram in view of both an amount of calculation and a quality of the 3D hologram, by selectively performing sub-sampling and full sampling.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 10 illustrates an operation of setting a reference value corresponding to a criterion for selectively performing sub-sampling and full sampling, according to example embodiments; and FIG. 11 illustrates a configuration of an apparatus for generating a hologram that may perform the method of FIG. 7.

DETAILED DESCRIPTION

Figure 1:
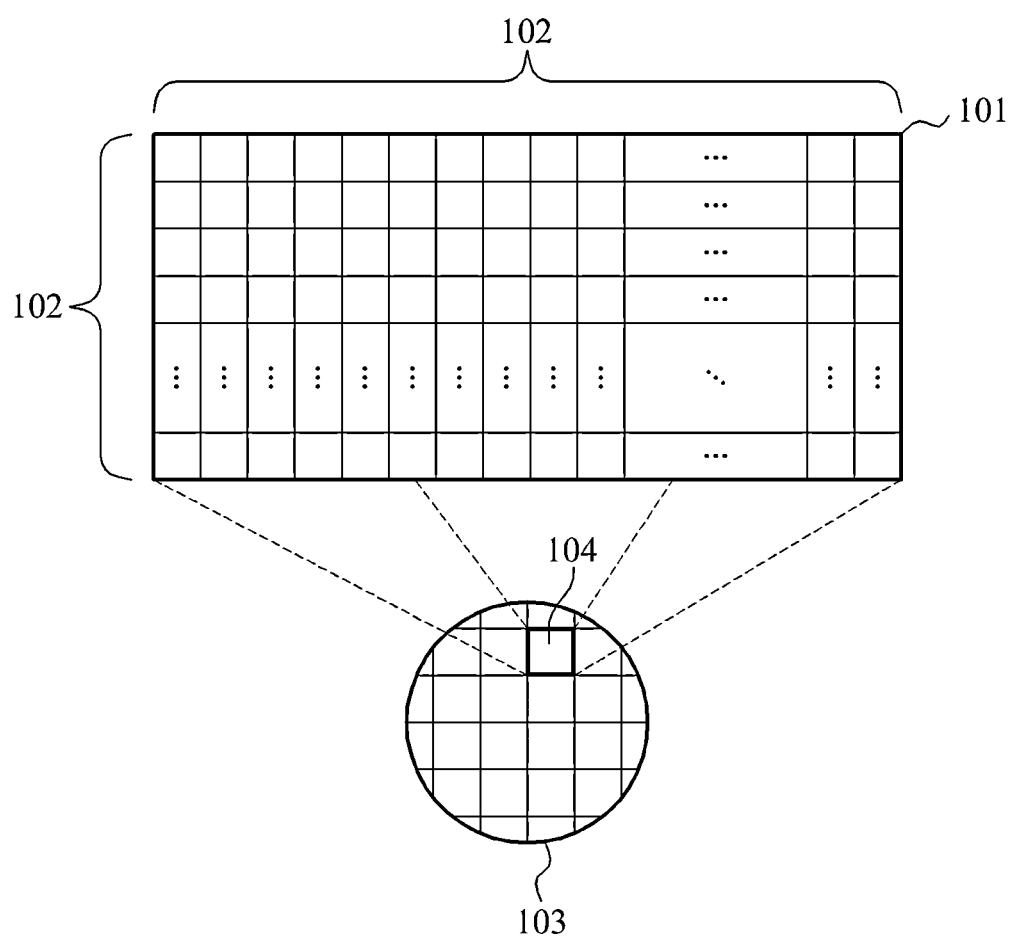
FIG. 1 illustrates a relationship between a spatial light modulator (SLM) and a three-dimensional (3D) object, according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a relationship between a spatial light modulator (SLM) and a three-dimensional (3D) object, according to example embodiments.

Referring to FIG. 1, an apparatus for generating a hologram may generate point holograms 101 for a plurality of 3D points included in a virtual 3D object 103, and may reproduce a 3D hologram based on a hologram pattern generated using the point holograms. That is, the apparatus may generate corresponding point holograms 101 for each 3D point.

For example, the apparatus may generate a point hologram 101 corresponding to a 3D point 104 using information about a spatial position of the 3D point 104. A point hologram 101 may include pixel values of a plurality of pixels 102 included in an SLM. For example, when the SLM includes N×N pixels, and the 3D object includes K 3D points, the apparatus may generate K point holograms, each including N×N pixels.

Figure 2:
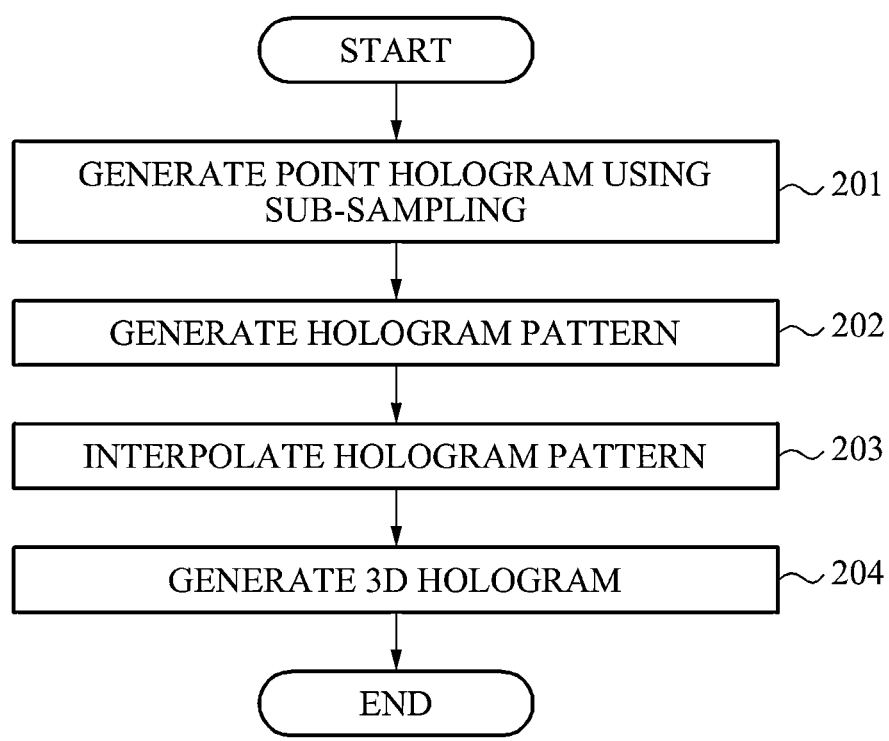
FIG. 2 illustrates a method of generating a hologram using sub-sampling, according to example embodiments.

FIG. 2 illustrates a method of generating a hologram using sub-sampling according to example embodiments.

Figure 6:
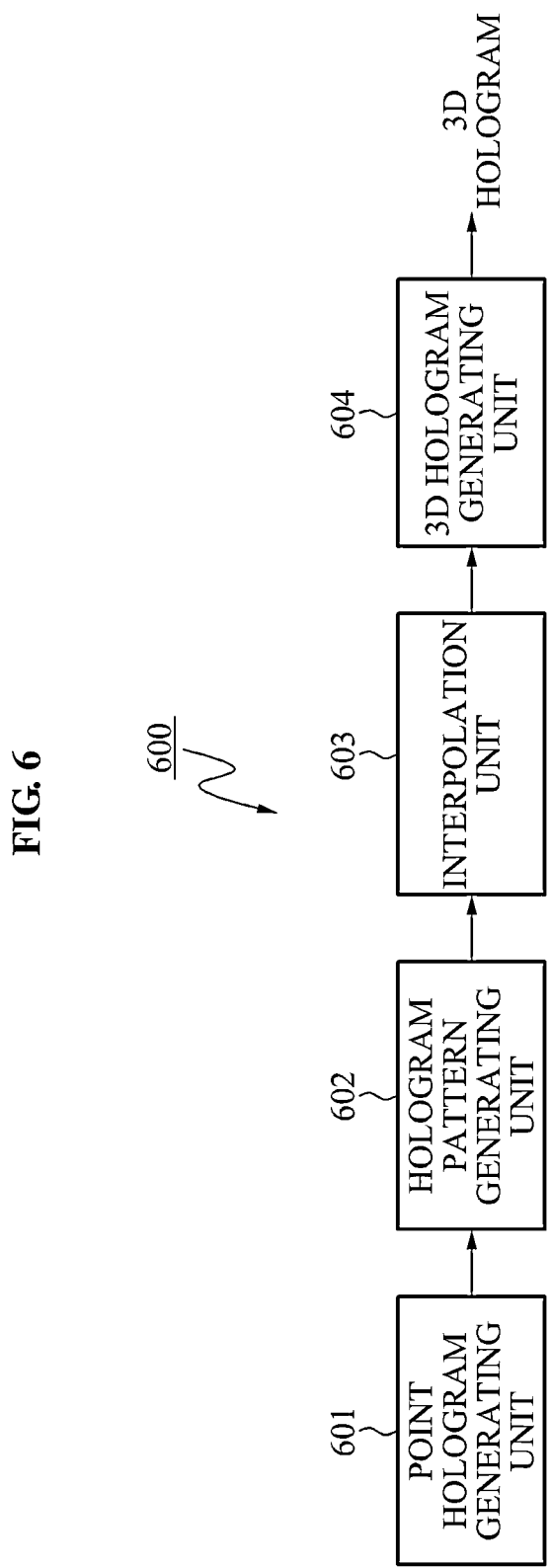
FIG. 6 illustrates a configuration of an apparatus for generating a hologram that may perform the method of FIG. 2.

The method of FIG. 2 may be performed by an apparatus 600 for generating a hologram of FIG. 6.

In operation 201, the apparatus 600 may generate a point hologram by performing sub-sampling on a plurality of pixels included in an SLM. Here, the sub-sampling may refer to determining some of the plurality of pixels included in the SLM to be reference pixels in order to generate a point hologram.

In this instance, the apparatus 600 may calculate a light distribution corresponding to each pixel included in the SLM, based on information about spatial coordinates of a 3D point, information about spatial coordinates of each of the plurality of pixels included in the SLM, corresponding to the 3D point, and a light distribution for the 3D point. Here, the light distribution for the 3D point may include a phase and size of a light generated at the 3D point. The apparatus 600 may generate a point hologram using the calculated light distribution corresponding to each pixel.

Figure 3:
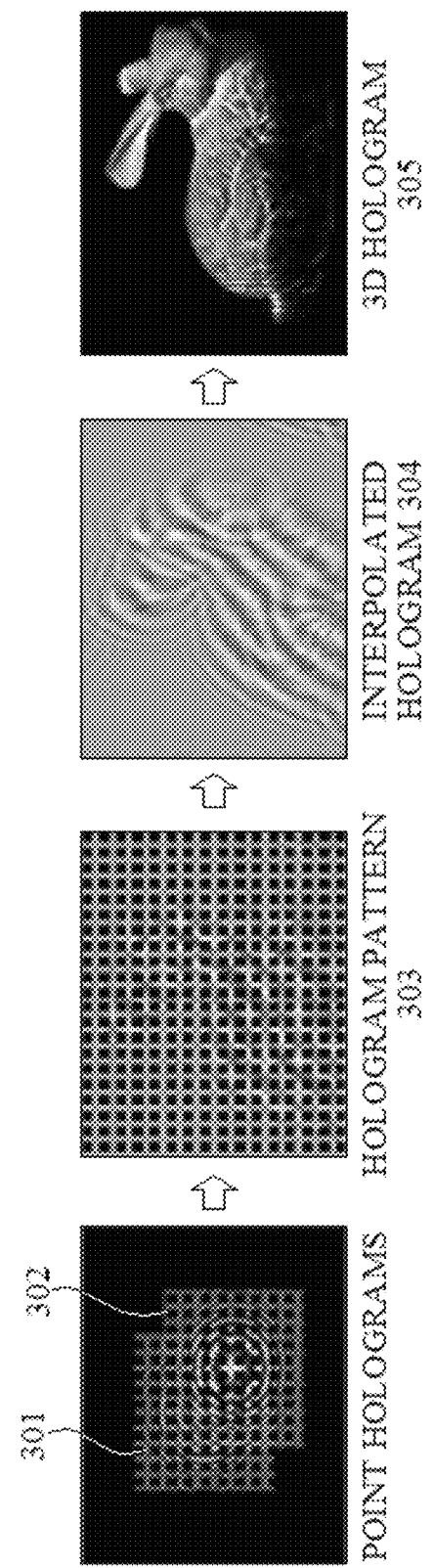
FIG. 3 illustrates an overall process of generating a 3D hologram using sub-sampling, according to example embodiments.

As an example, the apparatus 600 may calculate a light distribution for each reference pixel, among the plurality of pixels included in the SLM. The apparatus 600 may generate a point hologram corresponding to a 3D point using the calculated light distribution for each reference pixel. For example, a reference pixel may be predetermined to be a pixel having position coordinates (x, y) corresponding to a pair of even numbers or a pair of odd numbers. In this instance, when the reference pixel is predetermined to be a pixel positioned at coordinates corresponding to a pair of odd numbers, the apparatus 600 may calculate light distributions for odd numbered pixels, and may not calculate light distributions for even numbered pixels, among the plurality of pixels included in the SLM. Referring to FIG. 3, among a plurality of pixels included in a first point hologram 301 corresponding to a first 3D point of a 3D object, only odd numbered pixels may have pixel values, and even numbered pixels may not have pixel values. In addition, the apparatus 600 may generate point holograms 302 corresponding to K−1 3D points included in the 3D object, and each of the point holograms 302 corresponding to the K−1 3D points may include odd numbered pixels that may have pixel values and even numbered pixels that may not have pixel values.

As another example, the apparatus 600 may generate a point hologram corresponding to a 3D point by performing sub-sampling on the plurality of pixels included in the SLM in a direction of an x-axis and a direction of a y-axis, uniformly. For example, a reference pixel may be predetermined to be a pixel having position coordinates (x, y) corresponding to a pair of 1/2s, a pair of 1/4s, or a pair of 1/Ns, among the plurality of pixels included in the SLM. When the reference pixel is predetermined to be a pixel having coordinates corresponding to a pair of 1/4s, the apparatus 600 may calculate a light distribution for every fourth pixel in a direction of an x-axis and in a direction of a y-axis, among the plurality of pixels included in the SLM. The apparatus 600 may also generate a point hologram corresponding to a 3D point, using pixels for which light distributions may be calculated, and pixels for which light distributions may not be calculated. For example, each pixel having coordinates corresponding to a pair of 1/4s, among a plurality of pixels included in the generated point hologram, may have a pixel value. In addition, remaining pixels, excluding pixels having coordinates corresponding to a pair of 1/4s from the plurality of pixels included in the SLM, may not have pixel values.

In this instance, in calculating a light distribution for each sub-sampled pixel, the apparatus 600 may calculate the light distribution for each pixel using the Rayleigh-Sommerfeld Equation, as expressed by Equation 1. The apparatus 600 may generate a point hologram corresponding to each 3D point included in a 3D object using the calculated light distribution for each pixel.

$$U(x, y) = \frac{z}{j\lambda} \int \int_{-\infty}^{\infty} U(\xi, \eta) \frac{\exp(jkr_{01})}{r_{01}^2} d\xi d\eta, \quad [\text{Equation 1}]$$

$$r_{01} = \sqrt{(x-\xi)^2 + (y-\eta)^2 + z^2},$$

where U(x, y) denotes a light distribution for each pixel included in the SLM, that is, a light distribution for a pixel positioned at coordinates (x, y). $U(\xi,\eta)$ denotes a light distribution for a 3D point, and may include a phase and size of a light generated at the 3D point. $(\xi,\eta,z)$ denotes information about spatial coordinates of the 3D point, where $\xi$ denotes an abscissa of the 3D point, $\eta$ denotes an ordinate of the 3D point, and z denotes a depth value of the 3D point. Similarly, (x, y) denotes information about spatial coordinates of each of the plurality of pixels included in the SLM, where x denotes an abscissa of a pixel, and y denotes an ordinate of the pixel. $\lambda$ denotes a wavelength of light, and k denotes a wave number which may be obtained by dividing pi ($\pi$) by the wavelength of light, that is, $$k = \frac{\pi}{\lambda}.$$

In operation 202, the apparatus 600 may generate a hologram pattern using point holograms corresponding to a plurality of 3D points included in the 3D object.

Figure 4:
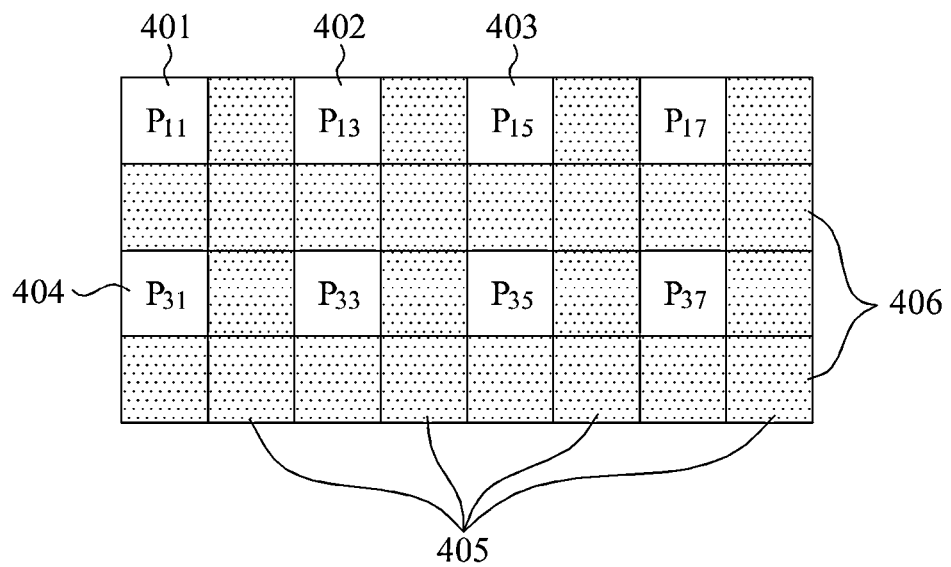
FIG. 4 illustrates pixel values of pixels included in a hologram pattern generated using sub-sampling, according to example embodiments.

In this instance, when K 3D points are included in the 3D object, the apparatus 600 may generate K point holograms. The apparatus 600 may generate a hologram pattern by accumulating the K point holograms. For example, referring to FIG. 3, the apparatus 600 may generate a hologram pattern 303 by accumulating the K point holograms, that is, the first point hologram 301 and the point holograms 302. In this instance, similar to the point hologram, among the plurality of pixels included in the hologram pattern, reference pixels may have pixel values and remaining pixels, excluding the reference pixels, may not have pixel values. For example, referring to FIG. 4, when a reference pixel corresponds to a pixel having coordinates corresponding to a pair of odd numbers, a hologram pattern generated by accumulating point holograms may also include pixels, having coordinates corresponding to a pair of odd numbers, that may have pixel values, for example, pixels 401, 402, 403, and 404, and pixels, having coordinates corresponding to a pair of even numbers, that may not have pixel values, for example, pixels 405, and 406.

In operation 203, the apparatus 600 may generate an interpolated hologram by performing an interpolation on the generated hologram pattern.

In this instance, the apparatus 600 may perform the interpolation on pixels that may not have pixel values, among the plurality of pixels included in the hologram pattern. For example, the apparatus 600 may perform the interpolation on the remaining pixels, excluding the reference pixels from the plurality of pixels included in the hologram pattern. In this instance, the apparatus 600 may interpolate pixel values of the remaining pixels using pixel values of the reference pixels.

Figure 5:
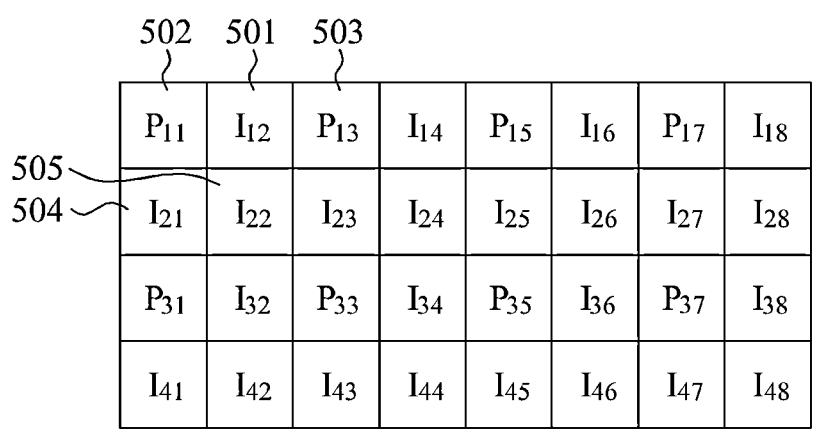
FIG. 5 illustrates a process of performing an interpolation on a hologram pattern, according to example embodiments.

For example, referring to FIG. 5, when the reference pixel is predetermined to be a pixel having coordinates corresponding to a pair of odd numbers, a second pixel 501 included in a hologram pattern may correspond to an even numbered pixel that may not have a pixel value as a result of performing sub-sampling. However, a first pixel 502 corresponding to a pixel neighboring the second pixel 501 may have a pixel value $P_{11}$, and a third pixel 503 corresponding to another pixel neighboring the second pixel 501 may have a pixel value $P_{13}$. The apparatus 600 may interpolate a pixel value for the second pixel 501 using the neighboring pixels 502 and 503 of the second pixel 501.

In this instance, the apparatus 600 may interpolate the pixel value for the second pixel 501 using linear interpolation. For example, the apparatus 600 may interpolate a pixel value $I_{12}$ for the second pixel 501 by dividing a sum of the pixel value $P_{11}$ of the first pixel 502 and the pixel value $P_{13}$ of the third pixel 503 by a number of neighboring pixels that are used for the interpolation, which may be expressed by $I_{12}=(P_{11}+P_{13})/2$. The apparatus 600 may interpolate a pixel value $I_{21}$ for a ninth pixel 504 using pixel values of neighboring pixels, which may be expressed by $I_{21}=(P_{11}+P_{31})/2$. The apparatus 600 may interpolate a pixel value $I_{22}$ for a tenth pixel 505 using pixel values of neighboring pixels, which may be expressed by $I_{22}=(P_{11}+P_{13}+P_{31}+P_{33})/4$. In addition, the apparatus 600 may perform the interpolation on all pixels that may not have pixel values among the plurality of pixels included in the hologram pattern. Here, referring to FIG. 3, the apparatus 600 may generate an interpolated hologram 304 by interpolating pixel values for pixels that may not have pixel values.

In operation 204, the apparatus 600 may generate a 3D hologram using the interpolated hologram. For example, referring to FIG. 3, the apparatus 600 may generate a 3D hologram 305 by modulating the interpolated hologram 304 using the SLM.

FIG. 6 illustrates a configuration of the apparatus 600 for generating a hologram that may perform the method of FIG. 2.

Referring to FIG. 6, the apparatus 600 may include a point hologram generating unit 601, a hologram pattern generating unit 602, an interpolation unit 603, and a 3D hologram generating unit 604.

The point hologram generating unit 601 may generate a point hologram by performing sub-sampling on a plurality of pixels included in an SLM.

As an example, the point hologram generating unit 601 may calculate a light distribution for each reference pixel, among the plurality of pixels included in the SLM. The point hologram generating unit 601 may generate a point hologram corresponding to a 3D point using the calculated light distribution for each reference pixel. For example, when a reference pixel that is predetermined to be a pixel having coordinates (x, y) corresponding to a pair of odd numbers, the point hologram generating unit 601 may calculate light distributions for odd numbered pixels, and may not calculate light distributions for even numbered pixels, among the plurality of pixels included in the SLM. The point hologram generating unit 601 may generate point holograms corresponding to 3D points included in a 3D object using the calculated light distributions for the odd numbered pixels.

As another example, the point hologram generating unit 601 may generate point holograms corresponding to the 3D points by performing sub-sampling on the plurality of pixels included in the SLM in a direction of an x-axis and a direction of a y-axis, uniformly. In this instance, a reference pixel may be predetermined to be a pixel having position coordinates (x, y) corresponding to a pair of 1/2s, a pair of 1/4s, or a pair of 1/Ns, among the plurality of pixels included in the SLM. For example, when the reference pixel is predetermined to be a pixel having coordinates corresponding to a pair of 1/4s, the apparatus 600 may calculate a light distribution for every fourth pixel in a direction of an x-axis and in a direction of a y-axis, among the plurality of pixels included in the SLM.

The hologram pattern generating unit 602 may generate a hologram pattern using the point holograms corresponding to the 3D points included in the 3D object. For example, when K 3D points are included in the 3D object, the hologram pattern generating unit 602 may generate a hologram pattern by accumulating K point holograms. In this instance, as a result of performing the sub-sampling, among a plurality of pixels included in the point hologram, reference pixels may have pixel values, and remaining pixels, excluding the reference pixels, may not have pixel values. Accordingly, among the plurality of pixels included in the hologram pattern generated by accumulating point holograms, reference pixels may have pixel values, and remaining pixels may not have pixel values.

The interpolation unit 603 may perform a linear interpolation on the hologram pattern in order to interpolate pixel values for the remaining pixels that may not have pixel values. For example, the interpolation unit 603 may interpolate a pixel value of a pixel desired to be interpolated, using pixel values of pixels neighboring the pixel desired to be interpolated, among reference pixels. Here, the pixel desired to be interpolated may refer to a pixel that may not have a pixel value, among a plurality of pixels included in a hologram pattern, and may correspond to one of remaining pixels, excluding the reference pixels.

The 3D hologram generating unit 604 may generate a 3D hologram using the interpolated hologram. In this instance, the 3D hologram generating unit 604 may generate the 3D hologram by modulating the interpolated hologram using the SLM.

As described with reference to FIGS. 2 through 6, the apparatus 600 may reduce an amount of calculation performed to obtain a light distribution for each pixel using sub-sampling. That is, the apparatus 600 may reduce the amount of calculation by calculating light distributions for some pixels that are predetermined to be reference pixels, and by not calculating light distribution for remaining pixels, excluding the reference pixels, among a plurality of pixels included in the SLM, thereby allowing for fast generation of a 3D hologram.

Hereinafter, a process of generating a 3D hologram selectively using sub-sampling and full sampling will be described with reference to FIGS. 7 through 11.

Figure 7:
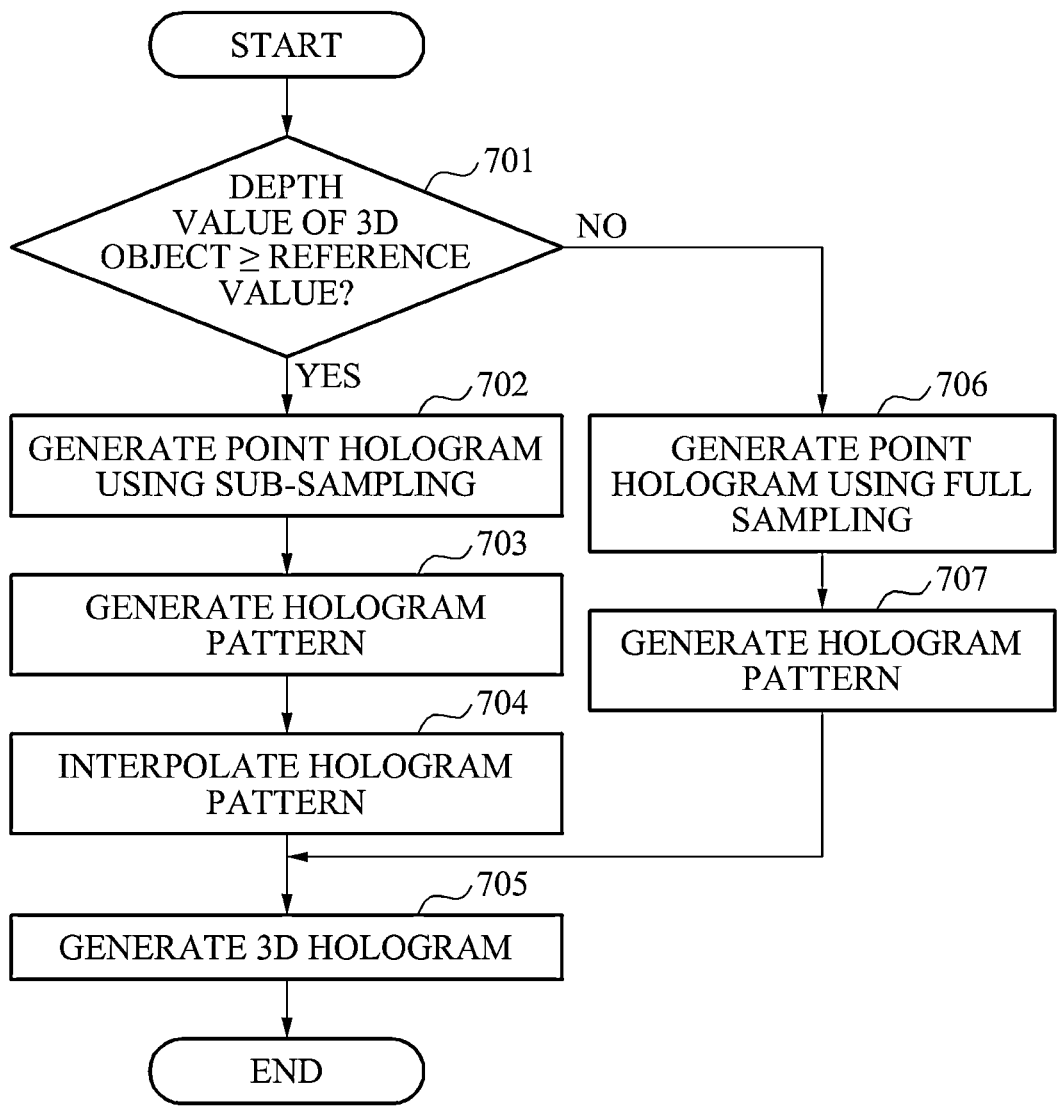
FIG. 7 illustrates a method of generating a hologram by selectively using sub-sampling and full sampling, according to example embodiments.
Figures 8, 9:
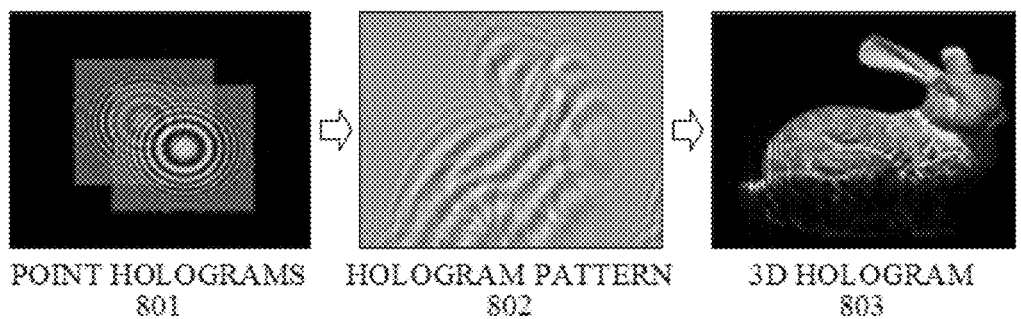
FIG. 8 illustrates an overall process of generating a 3D hologram through full sampling, according to example embodiments.
FIG. 9 illustrates pixel values of pixels included in a hologram pattern generated through full sampling, according to example embodiments.

FIG. 7 illustrates a method of generating a hologram by selectively using sub-sampling and full sampling, according to example embodiments.

The method of FIG. 7 may be performed by an apparatus 1100 of FIG. 11, for generating a hologram.

In operation 701, the apparatus 1100 may generate a point hologram by comparing depth information of a 3D object to a predetermined reference value, and selectively performing one of sub-sampling and full sampling based on a result of the comparing. Here, the sub-sampling may refer to determining some of a plurality of pixels included in an SLM to be reference pixels in order to generate a point hologram, and the full sampling may refer to generating a point hologram using all pixels included in the SLM.

For example, the apparatus 1100 may generate depth information by averaging depth values of 3D points included in the 3D object. The apparatus 1100 may compare an average depth value included in the depth information to the predetermined reference value.

In this instance, when the average depth value is greater than or equal to the predetermined reference value, the apparatus 1100 may perform sub-sampling on a plurality of pixels, included in the SLM, corresponding to the 3D point, in operation 702.

As an example, the apparatus 1100 may calculate light distributions for the reference pixels, and may not calculate light distributions for remaining pixels, excluding the reference pixels, among the plurality of pixels.

As another example, the apparatus 1100 may generate a point hologram corresponding to the 3D point by performing sub-sampling on the plurality of pixels included in the SLM in a direction of an x-axis and a direction of a y-axis, uniformly. In this case, the operation of generating the point hologram using sub-sampling is identical to the operation of generating the point hologram in operation 201 of FIG. 2, and thus, duplicated descriptions will be omitted for conciseness.

In operation 703, the apparatus 1100 may generate a hologram pattern by accumulating point holograms corresponding to the 3D points. For example, when K 3D points are included in the 3D object, and K point holograms are provided, the apparatus 1100 may generate a hologram pattern by accumulating the K point holograms.

In operation 704, the apparatus 1100 may generate an interpolated hologram by performing an interpolation on the generated hologram pattern.

For example, the apparatus 1100 may perform a linear interpolation on remaining pixels, excluding reference pixels from a plurality of pixels included in the hologram pattern. That is, the apparatus 1100 may interpolate pixel values of pixels that may not have pixel values, among the plurality of pixels included in the hologram pattern, using pixel values of neighboring pixels. Here, the operation of performing the interpolation on the hologram pattern is identical to the operation 203 of FIG. 2, and thus, duplicated descriptions will be omitted for conciseness.

In operation 705, the apparatus 1100 may generate a 3D hologram using the generated hologram pattern. In this instance, the apparatus 1100 may generate the 3D hologram by modulating each pixel included in the hologram pattern using the SLM.

Further, when the average depth value of the 3D object is less than the predetermined reference value, the apparatus 1100 may generate a point hologram by performing full sampling on a plurality of pixels, included in the SLM, corresponding to the 3D point, in operation 706.

In this instance, the apparatus 1100 may calculate a light distribution for each of the plurality of pixels included in the SLM. Here, a light distribution for a pixel may be expressed as a pixel value of the pixel. That is, the apparatus 1100 may generate a point hologram corresponding to a 3D point using the calculated light distribution for each of the plurality of pixels. For example, when the 3D object includes K 3D points, and the SLM includes N×N pixels, the apparatus 1100 may calculate light distributions for the N×N pixels for each 3D point. That is, referring to FIG. 8, the apparatus 1100 may generate K point holograms 801 including N×N pixels that may have light distributions.

In operation 707, the apparatus 1100 may generate a hologram pattern using the generated point hologram. For example, referring to FIG. 8, the apparatus 1100 may generate a hologram pattern 802 by accumulating the K point holograms 801. In this instance, referring to FIG. 9, all of the plurality of pixels included in the hologram pattern may have pixel values.

In operation 705, the apparatus 1100 may generate a 3D hologram using the generated hologram pattern. When the sub-sampling is used, only some of the plurality of pixels included in the hologram pattern may have pixel values. However, when the full sampling is used, all of the plurality of pixels included in the hologram pattern may have pixel values. Accordingly, in a case in which a 3D hologram is generated using the full sampling, an amount of calculation may increase, however, a 3D hologram having better quality may be provided, when compared to the sub-sampling.

FIG. 10 illustrates an operation of setting a reference value as a criterion for selectively performing sub-sampling and full sampling according to example embodiments.

In FIG. 10, an x-axis indicates a distance 1005 between a 3D object and an apparatus for generating a hologram including an SLM, and a y-axis indicates a change 1004 in quality of a 3D hologram based on the distance 1005.

Referring to FIG. 10, based on a distance D 1003, as the distance 1005 between the 3D object and the hologram generating apparatus increases, a difference in quality between a 3D hologram generated using full sampling 1001 and a 3D hologram generated using sub-sampling 1002 may decrease.

Similarly, based on the distance D 1003, as the distance 1005 between the 3D object and the hologram generating apparatus decreases, the difference in quality between the 3D hologram generated using full sampling 1001 and the 3D hologram generated using sub-sampling 1002 may increase. Accordingly, the hologram generating apparatus may pre-determine a reference value based on the change 1004 in quality of the 3D hologram based on the distance D 1003 between the 3D object and the hologram generating apparatus. For example, the reference value may be predetermined to be a value corresponding to the distance D 1003. When an average depth value of the 3D object is greater than or equal to the reference value corresponding to the distance D 1003, the hologram generating apparatus may generate a 3D hologram using sub-sampling. When the average depth value of the 3D object is less than the reference value corresponding to the distance D 1003, the hologram generating apparatus may generate a 3D hologram using full sampling.

FIG. 11 illustrates a configuration of the apparatus 1100 for generating a hologram that may perform the method of FIG. 7.

Referring to FIG. 11, the apparatus 1100 may include a point hologram generating unit 1101, a hologram pattern generating unit 1102, an interpolation unit 1103, and a 3D hologram generating unit 1104.

The point hologram generating unit 1101 may generate a point hologram by selectively performing one of sub-sampling and full sampling on a plurality of pixels included in an SLM based on depth information of a 3D object and a predetermined reference value.

For example, when an average depth value corresponding to the depth information of the 3D object is greater than or equal to the predetermined reference value, the point hologram generating unit 1101 may perform the sub-sampling on the plurality of pixels, included in the SLM, corresponding to each 3D point included in the 3D object.

When the average depth value corresponding to the depth information of the 3D object is less than the predetermined reference value, the point hologram generating unit 1101 may perform the full sampling on the plurality of pixels included in the SLM. Here, the operation of generating the point hologram using the sub-sampling is identical to the operation 702 of FIG. 7, and the operation of generating the point hologram using the full sampling is identical to the operation 706 of FIG. 7. Accordingly, duplicated descriptions will be omitted for conciseness.

The hologram pattern generating unit 1102 may generate a hologram pattern by accumulating point holograms corresponding to a plurality of 3D points included in the 3D object.

In this instance, when the hologram pattern is generated using the sub-sampling, the interpolation unit 1103 may generate an interpolated hologram by performing an interpolation on the generated hologram pattern. Here, the interpolation unit 1103 may generate the interpolated hologram by performing a linear interpolation. For example, the interpolation unit 1103 may interpolate pixel values of pixels that may not have pixel values using pixel values of reference pixels.

The 3D hologram generating unit 1104 may generate a 3D hologram by modulating the interpolated hologram using the SLM.

In this instance, when the hologram pattern is generated using the full sampling by the hologram pattern generating unit 1102, the hologram pattern generating unit 1102 may bypass the interpolation unit 1103, and may transfer the generated hologram pattern to the 3D hologram generating unit 1104. Here, a plurality of pixels included in the hologram pattern generated using the full sampling may have each pixel values, respectively. Since all pixels included in the hologram pattern have pixel values, the 3D hologram generating unit 1104 may generate the 3D hologram using the hologram pattern. For example, the 3D hologram generating unit 1104 may generate the 3D hologram by modulating each of the plurality of pixels included in the hologram pattern using the SLM.

Although it has been described with reference to FIGS. 7 and 11 that overall depth information of a 3D object is generated using an average of depth values of 3D points, it has been provided as an embodiment and is not limited thereto. The apparatus 1100 may segment the 3D object into a plurality of regions, and may selectively perform one of sub-sampling and full sampling for each of the plurality of regions segmented, based on depth information of each of the plurality of regions segmented and a predetermined reference value.

For example, when the 3D object is segmented into M regions, the apparatus 1100 may generate first depth information using an average of depth values of 3D points included in a first segmented region, generate second depth information using an average of depth values of 3D points included in a second segmented region, and also generate $M^{th}$ depth information using an average of depth values of 3D points included in an $M^{th}$ segmented region.

The apparatus 1100 may selectively perform one of the sub-sampling and the full sampling on the first segmented region, by comparing a depth value corresponding to the first depth information to the predetermined reference value. In addition, the apparatus 1100 may compare depth values, starting from a depth value corresponding to the second depth information to a depth value corresponding to the $M^{th}$ depth information, to the predetermined reference value, and may selectively perform one of the sub-sampling and the full sampling on the segmented regions, starting from the second segmented region to the $M^{th}$ segmented region, respectively, based on a result of the comparing. The apparatus 1100 may generate a hologram pattern by accumulating point holograms generated by selectively performing one of the sub-sampling and the full sampling for each of the segmented regions based on the result of the comparing. The apparatus 1100 may generate a 3D hologram using the generated hologram pattern.

The methods according to the above-described embodiments may be recorded in non-transitory computer-readable media including program instructions to implement various operations embodied by a computer. The media may also include, alone or in combination with the program instructions, data files, data structures, and the like. Examples of program instructions include both machine code, such as produced by a compiler, and files containing higher level code that may be executed by the computer using an interpreter. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the apparatus 600 for generating a hologram may include at least one processor to execute at least one of the above-described units and methods.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of generating a hologram, the method comprising:
    generating, by a processor, at least one point hologram by determining pixel values of sub-sampled reference pixels among the plurality of pixels included in a spatial light modulator (SLM) through sub-sampling on the plurality of pixels;
    generating a hologram pattern using the at least one generated point hologram;
    generating an interpolated hologram by determining pixel values of remaining pixels, excluding the reference pixels from the plurality of pixels, through an interpolation on the generated hologram pattern; and
    generating a three-dimensional (3D) hologram using the interpolated hologram,
    wherein the point hologram corresponds to a 3D point included in a 3D object and includes the pixel values of the reference pixels.

2. The method of claim 1, wherein the generating of the at least one point hologram comprises performing the sub-sampling by calculating light distributions for the reference pixels, among the plurality of pixels included in the SLM.

3. The method of claim 1, wherein the generating of the at least one point hologram comprises performing the sub-sampling on the plurality of pixels included in the SLM in a direction of an x-axis and in a direction of a y-axis, uniformly.

4. The method of claim 1, wherein the generating of the interpolated hologram comprises performing a linear interpolation on the remaining pixels using the pixel values of the reference pixels.

5. The method of claim 1, wherein
    the generating of the at least one point hologram comprises generating point holograms corresponding to a plurality of 3D points included in a 3D object, and
    the generating of the hologram pattern comprises generating the hologram pattern by accumulating the generated point holograms at the plurality of 3D points.

6. The method of claim 1, wherein the generating of the at least one point hologram comprises generating a point hologram by selectively performing the sub-sampling on a plurality of pixels included in a spatial light modulator (SLM) based on depth information of a three-dimensional (3D) object and a reference value.

7. The method of claim 6, wherein the generating of the interpolated hologram comprises performing the interpolation on the hologram pattern when a point hologram is generated using the sub-sampling.

8. The method of claim 6, wherein the generating of the point hologram comprises segmenting the 3D object into a plurality of regions, and performing the sub-sampling for each of the plurality of regions segmented, based on depth information of each of the plurality of regions segmented and the reference value.

9. The method of claim 6, wherein the reference value is predetermined to be a value corresponding to a change in quality of a 3D hologram, based on a distance between the 3D object and a hologram generating apparatus.

10. A non-transitory computer-readable medium comprising a program for instructing a computer to perform the method of claim 1.

11. The method of claim 1, further comprising:
selecting one of sub-sampling and full sampling applied to the plurality of pixels by comparing depth information of the 3D object to a predetermined reference value,
wherein the generating of at least one point hologram generates at least one point hologram using the selected sub-sampling or full-sampling.

12. The method of claim 11, wherein the selecting of one of sub-sampling and full sampling selects the sub-sampling, when the depth information of the 3D object is greater than or equal to the predetermined reference value.

13. The method of claim 11, wherein the selecting of one of sub-sampling and full sampling selects the full sampling, when the depth information of the 3D object is less than the predetermined reference value.

14. The method of claim 11, wherein the predetermined reference value is predetermined based on a change in quality of the 3D hologram generated at the depth information of the 3D object,
wherein the change in quality of the 3D hologram indicates difference in quality between a 3D hologram generated using the full sampling and a 3D hologram generated using the sub-sampling.

15. An apparatus for generating a hologram, the apparatus comprising:
a point hologram generating unit to generate a point hologram by determining pixel values of sub-sampled reference pixels among the plurality of pixels included in a spatial light modulator (SLM) through sub-sampling on the plurality of pixels;
a hologram pattern generating unit to generate a hologram pattern using the generated point hologram;
an interpolation unit to generate an interpolated hologram by determining pixel values of remaining pixels, excluding the reference pixels from the plurality of pixels, through an interpolation on the generated hologram pattern; and
a three-dimensional (3D) hologram generating unit to generate a 3D hologram using the interpolated hologram,
wherein the point hologram corresponds to a 3D point included in a 3D object and includes the pixel values of the reference pixels.

16. The apparatus of claim 15, wherein the point hologram generating unit performs the sub-sampling by calculating light distributions for the reference pixels, among the plurality of pixels included in the SLM.

17. The apparatus of claim 15, wherein the point hologram generating unit performs the sub-sampling on the plurality of pixels included in the SLM in a direction of an x-axis and in a direction of a y-axis, uniformly.

18. The apparatus of claim 15, wherein the interpolation unit performs an interpolation on the remaining pixels using the pixel values of the reference pixels.

19. The apparatus of claim 15, wherein
the point hologram generating unit generates point holograms at a plurality of 3D points included in a 3D object, and
the hologram pattern generating unit generates the hologram pattern by accumulating the generated point holograms at the plurality of 3D points.

20. The apparatus of claim 15, wherein the point hologram generating unit generates the point hologram by selectively performing the sub-sampling on a plurality of pixels included in a spatial light modulator (SLM) based on depth information of a three-dimensional (3D) object and a reference value.

21. The apparatus of claim 20, wherein the point hologram generating unit segments the 3D object into a plurality of regions, and performs the sub-sampling for each of the plurality of regions segmented, based on depth information of each of the plurality of regions segmented and the reference value.

22. The apparatus of claim 20, wherein the reference value is predetermined to be value corresponding to a change in quality of a 3D hologram, based on a distance between the 3D object and a hologram generating apparatus.

23. The apparatus of claim 15, wherein the point hologram generating unit selectively performs one of sub-sampling and full sampling, based on a comparison between depth information of a three-dimensional (3D) object and a predetermined reference value, and to generate plural point holograms using the selected sub-sampling or full-sampling.

24. The apparatus of claim 23, wherein the interpolation unit generates the interpolated hologram by performing an interpolation on the hologram pattern when a point hologram is generated using the sub-sampling.

25. The apparatus of claim 24, wherein the interpolation performed on the generated hologram pattern comprises assigning to a pixel to be interpolated a value obtained by calculating an average of reference pixels that surround the pixel to be interpolated.

* * * * *